(No Model.)
R. H. FRANKLIN.
POCKET KNIFE.
No. 456,087. Patented July 14, 1891.
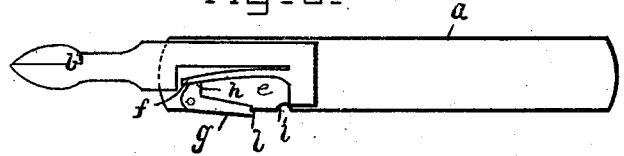
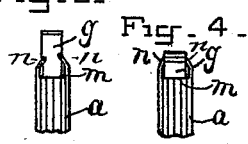
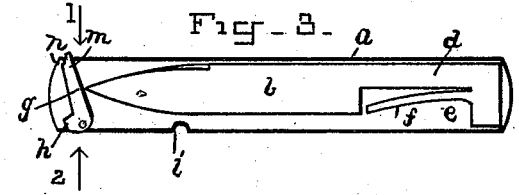
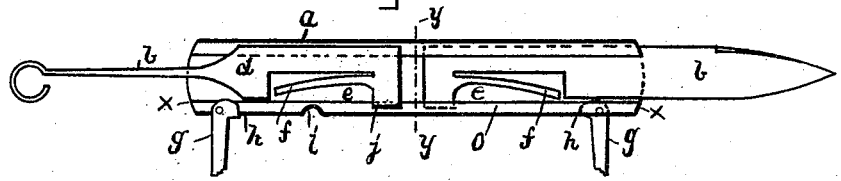
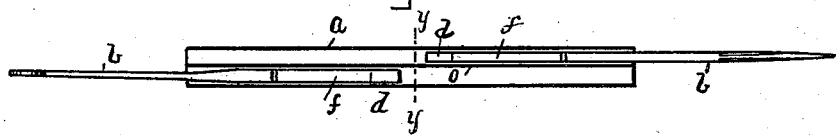
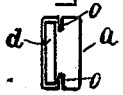
WITNESSES =
INVENTOR =
Rhodolph H Franklin
By H P Thayer atty.

UNITED STATES PATENT OFFICE.

RHODOLPH H. FRANKLIN, OF BROOKLYN, NEW YORK, ASSIGNOR TO CHARLES C. CUMMINGS, OF SAME PLACE.

POCKET-KNIFE.

SPECIFICATION forming part of Letters Patent No. 456,087, dated July 14, 1891.

Application filed November 4, 1890. Serial No. 370,275. (No model.)

*To all whom it may concern:*

Be it known that I, RHODOLPH H. FRANKLIN, a citizen of the United States, and a resident of Brooklyn, in the county of Kings and State of New York, have invented new and useful Improvements in Pocket-Knives, of which the following is a specification.

My invention consists in improved contrivances of fastening devices for use in connection with a blade which slides out and in the handle at one end for opening and closing the knife, all as hereinafter fully described, reference being made to the accompanying drawings, in which—

Figure 1 is a side elevation of a knife constructed according to my invention with the blade open for use. Fig. 2 is a similar view with the side of the handle removed, but with the blade shaped as an erasing-knife. Fig. 3 is a side view of the knife closed, with one side of the handle removed. Figs. 4 and 5 are views of a portion of the knife as seen looking in the direction of the arrow in Fig. 3 and illustrating the manner of fastening the blade in the handle when closed. Fig. 6 is a side view of the knife with one side of the handle removed and showing the arrangement for two blades to open from the opposite ends, respectively. Fig. 7 represents a longitudinal section of the handle on line $x\,x$ of Fig. 6, and Fig. 8 a transverse section of said handle on line $y\,y$ of Figs. 6 and 7. Fig. 9 is a view of a portion of the handle as seen in the direction of arrow 2, Fig. 3.

The handle $a$ may be a flat-sided tube of sheet metal or other approved material with an opening at one or both ends, according as a blade $b$ is to be provided at one end only or at both ends. The blade has a flat shank $d$ nearly filling the hollow space, except where a portion is cut away at $e$ along one edge, and is adapted to slide freely for projecting it for use and for sheathing it in the handle. At the bottom of the notch $e$ in the edge of the shank a strong spring $f$ is formed of a tongue of metal partly separated from the rest of the shank, and in the edge of the handle the cam-lever $g$ is pivoted near the open end where the spring comes to rest inside of it, when the blade is shoved out suitably for clamping the blade fast by shifting the cam into the position represented in Fig. 2, with the greatest projection $h$ of the cam bearing on and compressing the spring, so as to secure the blade in position for use by clamping the back edge against the inside of the handle with powerful effect, holding it securely. This spring is in this example an integral portion of the blade, which is the preferable arrangement; but it may be made separately and fastened on the shank of the blade, if desired. A stop $i$ limits the extent of the projection of the blade by obstructing the corner $j$ at the rear end of the notch $e$. Said stop is preferably made by indenting the outer edge of the handle after the shank of the blade has been inserted; but it may be made in any other approved way, as a pin inserted through the sides of the handle and riveted at the ends.

The handle is slotted for a short portion of its length, as shown at $k$ in Fig. 9, to permit the cam-lever to close into the slot, as in Fig. 2, when fastening the blade in the open position, in which position the flat extremity of the projection $h$, bearing on the spring $f$, maintains by its angular relation the extremity $l$ of the cam in a slight projection above the surface of the handle, so that it can be readily engaged by the thumb or finger nail to raise the cam and release the spring when it is desired to close the knife. The other edge of the handle is likewise slotted for a short distance at $m$ to permit the free end of the cam-lever to swing into the notch, as represented in Fig. 3, when the knife is closed and the corners $n$ of the handle are bent inward, as indicated in Figs. 4 and 5, so that said end of the cam-lever presses them apart and they grip on or partly around and hold it in that position for confining the blade in the handle, and the end of the cam-lever projects slightly beyond the surface of the handle here also for being forced out of the grip of the corners of the handle by the thumb when the knife is to be opened, for which the knife is to be held with the end out of which the blade is to issue downward in suitable position for pushing the cam-lever out of the grip of corner $n$ by the thumb. The blade will then drop out, and the cam may be turned by the forefinger into the other position for clamping the blade fast.

For shutting the knife it is to be turned up the other way for the blade to drop back into the handle, and the cam-lever is to be thrust off from the spring and back into the slot *m* between the grip-corners *n*. It will be seen that the cam-lever secures the blade in both of its positions. If two blades are to be used, suitable ribs *o* will be provided within the handle to prevent interference, and a cam will be provided for each. Said blades may be arranged to open at opposite ends of the handle, as I have represented in the drawings, or they may both open at one end, if preferred, as is obvious.

The parting ribs *o*, to prevent interference of the blade, may be produced by doubling in the shell of the handle, as shown in Fig. 8, when the handle is made of a thin metal tube; but they may be otherwise produced, if preferred.

In Fig. 2 I represent the blade as shaped for an eraser, and in Fig. 6 I represent a button-hook. The special form or adaptation of the blade is of course immaterial.

I claim—

1. The combination of the hollow handle having the open end, the blade having the shank fitted to slide therein and notched in one edge, the clamping-spring attached to the shank in said notch, and the clamping cam-lever pivoted in the handle suitably for clamping said blade by the spring when projected for use, said handle having the slot in the side for the cam-lever, substantially as described.

2. The combination of the hollow handle having the open end, the blade having the shank fitted to slide therein and notched in one edge, the clamping-spring attached to the shank in said notch, the clamping cam-lever pivoted in the handle suitably for clamping said blade by the spring when projected for use, and the bent corners of the slotted handle adapted to grip and hold the cam-lever to confine the blade in the handle, substantially as described.

In testimony that I claim the foregoing as my invention I have signed my name, in presence of two witnesses, this 24th day of October, 1890.

RHODOLPH H. FRANKLIN.

Witnesses:
W. J. MORGAN,
WILFRED B. EARLL.